United States Patent
Gehtman et al.

(10) Patent No.: US 12,039,072 B2
(45) Date of Patent: Jul. 16, 2024

(54) DATA PROTECTION USING ENCRYPTION AND INSERTED EXECUTION CODE

(71) Applicant: EMC IP Holding Company LLC, Hopkinton, MA (US)

(72) Inventors: Yevgeni Gehtman, Modi'in (IL); Tomer Shachar, Omer (IL); Maxim Balin, Gan-Yavne (IL)

(73) Assignee: EMC IP Holding Company, Hopkinton, MA (US)

( * ) Notice: Subject to any disclaimer, the term of this patent is extended or adjusted under 35 U.S.C. 154(b) by 134 days.

(21) Appl. No.: 17/387,046

(22) Filed: Jul. 28, 2021

(65) Prior Publication Data

US 2023/0034530 A1 Feb. 2, 2023

(51) Int. Cl.
  *G06F 21/62* (2013.01)
  *G06F 21/31* (2013.01)
  *G06F 21/60* (2013.01)
  *G06F 21/64* (2013.01)

(52) U.S. Cl.
  CPC .......... *G06F 21/6227* (2013.01); *G06F 21/31* (2013.01); *G06F 21/602* (2013.01); *G06F 21/64* (2013.01)

(58) Field of Classification Search
  CPC .... G06F 21/6227; G06F 21/31; G06F 21/602; G06F 21/64
  See application file for complete search history.

(56) References Cited

U.S. PATENT DOCUMENTS

| | | | |
|---|---|---|---|
| 6,785,815 B1 * | 8/2004 | Serret-Avila | G11B 20/00123 713/176 |
| 7,406,603 B1 * | 7/2008 | MacKay | G06F 21/55 726/16 |
| 8,181,033 B1 * | 5/2012 | Paul | H04L 63/1416 726/28 |

(Continued)

OTHER PUBLICATIONS

Https://www.ftc.gov/tips-advice/business-center/guidance/data-breach-response-guide-business, downloaded on Jul. 26, 2021.

(Continued)

*Primary Examiner* — Shin-Hon (Eric) Chen
*Assistant Examiner* — Ethan V Vo
(74) *Attorney, Agent, or Firm* — Ryan, Mason & Lewis, LLP

(57) ABSTRACT

Data protection techniques are provided that use encryption and inserted execution code. One method comprises obtaining, by a user device, a request from a user to access data, wherein the requested data comprises (i) an environment-based signature indicating an environment where the data can be accessed and (ii) execution code that interacts with a data protection agent; in response to the request to access the data: determining whether the user device comprises a data protection agent; and providing, via the data protection agent, the requested data based on an evaluation of an environment-based signature generated by the data protection agent relative to the environment-based signature included in the requested data. The requested data may be created by a given data protection agent that generates the environment-based signature using identifiers of hardware elements, software elements and/or network elements associated with a device that executes the given data protection agent.

20 Claims, 6 Drawing Sheets

(56) References Cited

U.S. PATENT DOCUMENTS

| | | | | |
|---|---|---|---|---|
| 8,719,586 | B1* | 5/2014 | Paleja | G06F 21/12 726/20 |
| 11,210,412 | B1* | 12/2021 | Ghetti | H04L 63/083 |
| 2006/0101047 | A1* | 5/2006 | Rice | G06F 21/14 |
| 2008/0028474 | A1* | 1/2008 | Horne | H04L 9/3226 726/27 |
| 2008/0059609 | A1* | 3/2008 | Ng | H04N 21/8358 709/220 |
| 2010/0275034 | A1* | 10/2010 | Safa | G06F 21/125 717/130 |
| 2011/0283362 | A1* | 11/2011 | Horneff | H04H 20/38 455/3.06 |
| 2014/0066015 | A1* | 3/2014 | Aissi | H04W 4/60 455/411 |
| 2015/0095652 | A1* | 4/2015 | Song | H04L 9/0861 713/176 |
| 2017/0255779 | A1* | 9/2017 | Caklovic | G06F 21/54 |
| 2021/0089646 | A1* | 3/2021 | Caklovic | G06F 21/51 |
| 2022/0300606 | A1* | 9/2022 | Veettikattil | G06F 21/54 |

OTHER PUBLICATIONS

Https://digitalguardian.com/blog/data-breach-experts-share-most-important-next-step-you-should-take-after-data-breach-2014-2015, downloaded on Jul. 26, 2021.

Https://www.securitymetrics.com/learn/how-to-effectively-manage-a-data-breach,downloaded on Jul. 26, 2021.

\* cited by examiner

DATA PROTECTION USING ENCRYPTION AND INSERTED EXECUTION CODE

FIELD

The field relates generally to information processing systems, and more particularly to the protection of data in such information processing systems.

BACKGROUND

Data loss prevention tools aim to prevent sensitive data from being accessed or misused by unauthorized users. A data leak, for example, occurs when confidential, sensitive, and/or protected data is released to an untrusted environment. Once a data loss prevention tool detects an unauthorized access or use of data, one or more protective actions are typically performed to protect the data (for example, by encrypting the data) and/or to generate alerts.

A need remains for improved techniques for protecting data from unauthorized users.

SUMMARY

In one embodiment, a method comprises obtaining, by a particular user device, at least one request from a user to access data, wherein the requested data comprises (i) a first environment-based signature indicating an environment where the data can be accessed and (ii) execution code that interacts with at least one data protection agent; in response to the at least one request to access the data: determining whether the particular user device comprises a first data protection agent; and providing, via the first data protection agent, the requested data based at least in part on an evaluation of a second environment-based signature generated by the first data protection agent relative to the first environment-based signature included in the requested data.

In some embodiments, the requested data is created by a second data protection agent (e.g., the second data protection agent may be a same data protection agent or a different data protection agent relative to the first data protection agent) that generates the first environment-based signature using one or more identifiers of one or more of hardware elements, software elements and network elements associated with a device that executes the second data protection agent. The second data protection agent may also (i) encrypt at least a portion of the requested data using an encryption key based at least in part on the first environment-based signature and/or (ii) digitally sign a file-dependent value (e.g., a hash value) associated with the requested data.

In one or more embodiments, the requested data may be encrypted, and the first data protection agent may derive a decryption key based on the first environment-based signature included in the requested data to decrypt the encrypted requested data. In addition, the requested data may further comprise a digital signature and the first data protection agent may verify the digital signature.

Other illustrative embodiments include, without limitation, apparatus, systems, methods and computer program products comprising processor-readable storage media.

DETAILED DESCRIPTION

Illustrative embodiments of the present disclosure will be described herein with reference to exemplary communication, storage and processing devices. It is to be appreciated, however, that the disclosure is not restricted to use with the particular illustrative configurations shown. One or more embodiments of the disclosure provide methods, apparatus and computer program products for data protection using encryption and inserted execution code.

When a malicious actor gains access to a restricted area, the malicious actor can typically copy one or more desired files and open them in another location. One or more aspects of the present disclosure protect files and other data after they have been released to an untrusted environment. In one or more embodiments, the disclosed techniques for data protection using encryption and inserted execution code provide active functionality to detect when an attempt is made to open a file in an unauthorized or untrusted environment, for example.

Some embodiments of the disclosed data protection techniques provide multiple layers of protection. A first layer of protection is provided by encrypting a body (e.g., contents) of a file. In at least one embodiment, the first protection layer employs an encryption key based at least in part on an environment-based file signature (which is based on identifiers associated with software and/or hardware components, as discussed further below). A second layer of protection inserts the environment-based file signature and execution code in the encrypted file, for example, using steganography techniques. Steganography conceals information within a file, document or message, for example.

When a user attempts to open the protected file, the protected file is opened, which, in turn, launches the embedded execution code as one or more processes or sub-processes (e.g., threads). The embedded execution code ensures that a data protection agent is executing on the device of the user. The data protection agent verifies the execution environment using the environment-based file signature obtained from the file.

Figure 1:
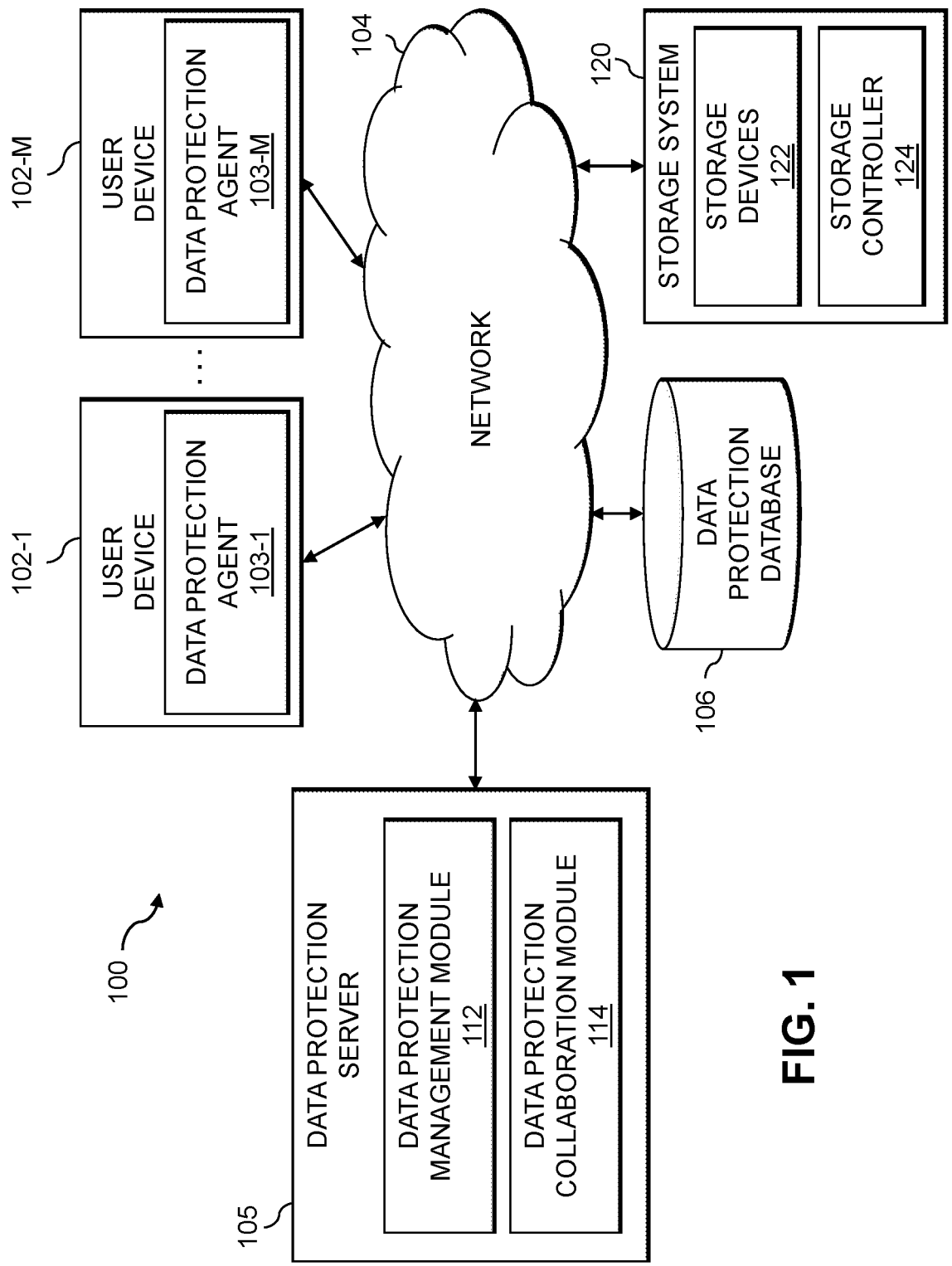
FIG. 1 illustrates an information processing system configured for data protection using encryption and inserted execution code in accordance with an illustrative embodiment.

FIG. 1 shows a computer network (also referred to herein as an information processing system) 100 configured in accordance with an illustrative embodiment. The computer network 100 comprises a plurality of user devices 102-1 through 102-M, collectively referred to herein as user devices 102 and a storage system 120. The user devices 102 are coupled to a network 104, where the network 104 in this embodiment is assumed to represent a sub-network or other related portion of the larger computer network 100. Accordingly, elements 100 and 104 are both referred to herein as examples of "networks" but the latter is assumed to be a component of the former in the context of the FIG. 1 embodiment. Also coupled to network 104 is one or more data protection servers 105 and data protection databases 106, discussed below.

The user devices 102 may comprise, for example, host devices and/or devices such as mobile telephones, laptop computers, tablet computers, desktop computers or other types of computing devices. Such devices are examples of what are more generally referred to herein as "processing devices." Some of these processing devices are also generally referred to herein as "computers." The user devices 102 may comprise a network client that includes networking capabilities such as ethernet, Wi-Fi, etc. When the user devices 102 are implemented as host devices, the host devices may illustratively comprise servers or other types of computers of an enterprise computer system, cloud-based computer system or other arrangement of multiple compute nodes associated with respective users.

For example, the host devices in some embodiments illustratively provide compute services such as execution of one or more applications on behalf of each of one or more users associated with respective ones of the host devices.

The user devices 102 in some embodiments comprise respective processing devices associated with a particular company, organization or other enterprise or group of users. In addition, at least portions of the computer network 100 may also be referred to herein as collectively comprising an "enterprise network." Numerous other operating scenarios involving a wide variety of different types and arrangements of processing devices and networks are possible, as will be appreciated by those skilled in the art.

The user devices 102 in some embodiments may also comprise a respective data protection agent 103-1 through 103-M (collectively referred to herein as data protection agents 103) that implements at least a portion of the disclosed techniques for data leakage protection using encryption and inserted execution code, as discussed further below in conjunction with FIGS. 2 through 4. In at least some embodiments, a data protection agent 103 is present on each device of an authorized collaborator, such as a team or department member. For example, a data protection agent 103 can be installed on each user device 102 within an authorized environment, such as on the user device 102 of each team member, the user device 102 of each department member, or the user device 102 of each division or enterprise member. The data protection agent 103 intercepts one or more operations on a file, such as a file save operation (e.g., a write operation) or a file open operation (e.g., a read operation). Upon detecting an intercepted file operation, the data protection agent 103 performs the appropriate functions to protect the file in accordance with the disclosed data leakage protection techniques. The protected data (e.g., a file) can be stored locally (e.g., on the respective user device 102) or the protected data can be stored by a server or in the storage system 120.

It is to be appreciated that the term "user" in this context and elsewhere herein is intended to be broadly construed so as to encompass, for example, human, hardware, software or firmware entities, as well as various combinations of such entities. Compute and/or storage services may be provided for users under a Platform-as-a-Service (PaaS) model, an Infrastructure-as-a-Service (IaaS) model and/or a Function-as-a-Service (FaaS) model, although it is to be appreciated that numerous other cloud infrastructure arrangements could be used. Also, illustrative embodiments can be implemented outside of the cloud infrastructure context, as in the case of a stand-alone computing and storage system implemented within a given enterprise.

The data protection server 105 may be implemented, for example, on the cloud or on the premises of an enterprise or another entity. In some embodiments, the data protection server 105, or portions thereof, may be implemented as part of a storage system or on a host device. As also depicted in FIG. 1, the data protection server 105 further comprises a data protection management module 112 and a data protection collaboration module 114. In some embodiments, the data protection management module 112 manages the various data protection agents 103 on each user device 102 (for example, in some embodiments, the data protection management module 112 may maintain and/or access a record of the hardware and/or software components currently installed on each user device 102 that are used for the generation of an environment-based signature). The data protection collaboration module 114 manages the authorization and credentials of the authorized users that collaborate in a group (e.g., a team, department or division). For example, the data protection collaboration module 114 may utilize records of a human resources department and/or distribution lists to identify authorized members of a particular group.

It is to be appreciated that this particular arrangement of modules 112 and 114 illustrated in the data protection server 105 of the FIG. 1 embodiment is presented by way of example only, and alternative arrangements can be used in other embodiments. For example, the functionality associated with modules 112 and 114 in other embodiments can be combined into a single module, or separated across a larger number of modules. As another example, multiple distinct processors can be used to implement different ones of modules 112 and 114 or portions thereof.

At least portions of modules 112 and 114 may be implemented at least in part in the form of software that is stored in memory and executed by a processor. An exemplary process utilizing modules 112 and 114 of an example data protection server 105 in computer network 100 will be described in more detail with reference to the flow diagrams of, for example, FIGS. 2 through 4.

Additionally, the data protection server 105 can have an associated data protection database 106 configured to store, for example, an indication for each protected file of the scope of the authorized environment (e.g., whether the file may be accessed only by a particular user and/or members of a particular team), and/or environment-based file signatures pertaining to one or more exemplary files that may be protected using the disclosed techniques for data protection. In addition, the data protection database 106 can store user credentials and identifiers of the authorized users in a particular environment (e.g., of each team member, department member, division member or enterprise member).

The data protection database 106 in the present embodiment is implemented using one or more storage systems associated with the data protection server 105. Such storage systems can comprise any of a variety of different types of storage such as, network-attached storage (NAS), storage area networks (SANs), direct-attached storage (DAS) and distributed DAS, as well as combinations of these and other storage types, including software-defined storage.

The user devices 102 and the data protection server 105 may be implemented on a common processing platform, or on separate processing platforms. The user devices 102 (for example, when implemented as host devices) are illustratively configured to write data to and read data to/from the storage system 120 in accordance with applications executing on those host devices for system users.

The storage system 120 comprises a plurality of storage devices 122 and an associated storage controller 124. The storage system 120 may store at least a portion of the protected data (e.g., protected files). The storage devices 122 store data of a plurality of storage volumes, such as respective logical units (LUNs) or other types of logical storage volumes. The term "storage volume" as used herein is intended to be broadly construed, and should not be viewed as being limited to any particular format or configuration.

The storage devices 122 of the storage system 120 illustratively comprise solid state drives (SSDs). Such SSDs are implemented using non-volatile memory (NVM) devices such as flash memory. Other types of NVM devices that can be used to implement at least a portion of the storage devices 122 include non-volatile RAM (NVRAM), phase-change RAM (PC-RAM), magnetic RAM (MRAM), resistive RAM, spin torque transfer magneto-resistive RAM (STT-MRAM), and Intel Optane™ devices based on 3D XPoint™ memory. These and various combinations of multiple different types of NVM devices may also be used. For example, hard disk drives (HDDs) can be used in combination with or in place of SSDs or other types of NVM devices in the storage system 120.

It is therefore to be appreciated that numerous different types of storage devices 122 can be used in storage system 120 in other embodiments. For example, a given storage system as the term is broadly used herein can include a combination of different types of storage devices, as in the case of a multi-tier storage system comprising a flash-based fast tier and a disk-based capacity tier. In such an embodiment, each of the fast tier and the capacity tier of the multi-tier storage system comprises a plurality of storage devices with different types of storage devices being used in different ones of the storage tiers. For example, the fast tier may comprise flash drives while the capacity tier comprises HDDs. The particular storage devices used in a given storage tier may be varied in other embodiments, and multiple distinct storage device types may be used within a single storage tier. The term "storage device" as used herein is intended to be broadly construed, so as to encompass, for example, SSDs, HDDs, flash drives, hybrid drives or other types of storage devices.

The term "storage system" as used herein is therefore intended to be broadly construed, and should not be viewed as being limited to particular storage system types, such as, for example, CAS systems, distributed storage systems, or storage systems based on flash memory or other types of NVM storage devices. A given storage system as the term is broadly used herein can comprise, for example, any type of system comprising multiple storage devices, such as network-attached storage (NAS), storage area networks (SANs), direct-attached storage (DAS) and distributed DAS, as well as combinations of these and other storage types, including software-defined storage.

The user devices 102 are configured to interact over the network 104 with the data protection server 105 and/or storage devices 122.

The term "processing platform" as used herein is intended to be broadly construed so as to encompass, by way of illustration and without limitation, multiple sets of processing devices and associated storage systems that are configured to communicate over one or more networks. For example, distributed implementations of the system 100 are possible, in which certain components of the system reside in one data center in a first geographic location while other components of the system reside in one or more other data centers in one or more other geographic locations that are potentially remote from the first geographic location. Thus, it is possible in some implementations of the system 100 for the user devices 102 and the storage system to reside in different data centers. Numerous other distributed implementations of the host devices and the storage system are possible.

The network 104 is assumed to comprise a portion of a global computer network such as the Internet, although other types of networks can be part of the computer network 100, including a wide area network (WAN), a local area network (LAN), a satellite network, a telephone or cable network, a cellular network, a wireless network such as a Wi-Fi or WiMAX network, or various portions or combinations of these and other types of networks. The computer network 100 in some embodiments therefore comprises combinations of multiple different types of networks, each comprising processing devices configured to communicate using internet protocol (IP) or other related communication protocols.

Also associated with the user devices 102 and/or the data protection server 105 can be one or more input-output devices (not shown), which illustratively comprise keyboards, displays or other types of input-output devices in any combination. Such input-output devices can be used, for example, to support one or more user interfaces to the data protection server 105, as well as to support communication between the data protection server 105 and other related systems and devices not explicitly shown.

The user devices 102 and the data protection server 105 in the FIG. 1 embodiment are assumed to be implemented using at least one processing device. Each such processing device generally comprises at least one processor and an associated memory, and implements one or more functional modules for controlling certain features of the data protection server 105.

More particularly, user devices 102 and data protection server 105 in this embodiment each can comprise a processor coupled to a memory and a network interface.

The processor illustratively comprises a microprocessor, a microcontroller, an application-specific integrated circuit (ASIC), a field-programmable gate array (FPGA) or other type of processing circuitry, as well as portions or combinations of such circuitry elements.

The memory illustratively comprises random access memory (RAM), read-only memory (ROM) or other types of memory, in any combination. The memory and other memories disclosed herein may be viewed as examples of what are more generally referred to as "processor-readable storage media" storing executable computer program code or other types of software programs.

One or more embodiments include articles of manufacture, such as computer-readable storage media. Examples of an article of manufacture include, without limitation, a storage device such as a storage disk, a storage array or an integrated circuit containing memory, as well as a wide variety of other types of computer program products. The term "article of manufacture" as used herein should be understood to exclude transitory, propagating signals. These and other references to "disks" herein are intended to refer generally to storage devices, including SSDs, and should therefore not be viewed as limited in any way to spinning magnetic media.

The network interface allows the user devices 102 and/or the data protection server 105 to communicate over the network 104 with each other (as well as one or more other networked devices), and illustratively comprises one or more conventional transceivers.

It is to be understood that the particular set of elements shown in FIG. 1 for data protection using encryption and inserted execution code is presented by way of illustrative example only, and in other embodiments additional or alternative elements may be used. Thus, another embodiment includes additional or alternative systems, devices and other network entities, as well as different arrangements of modules and other components.

Figure 2:
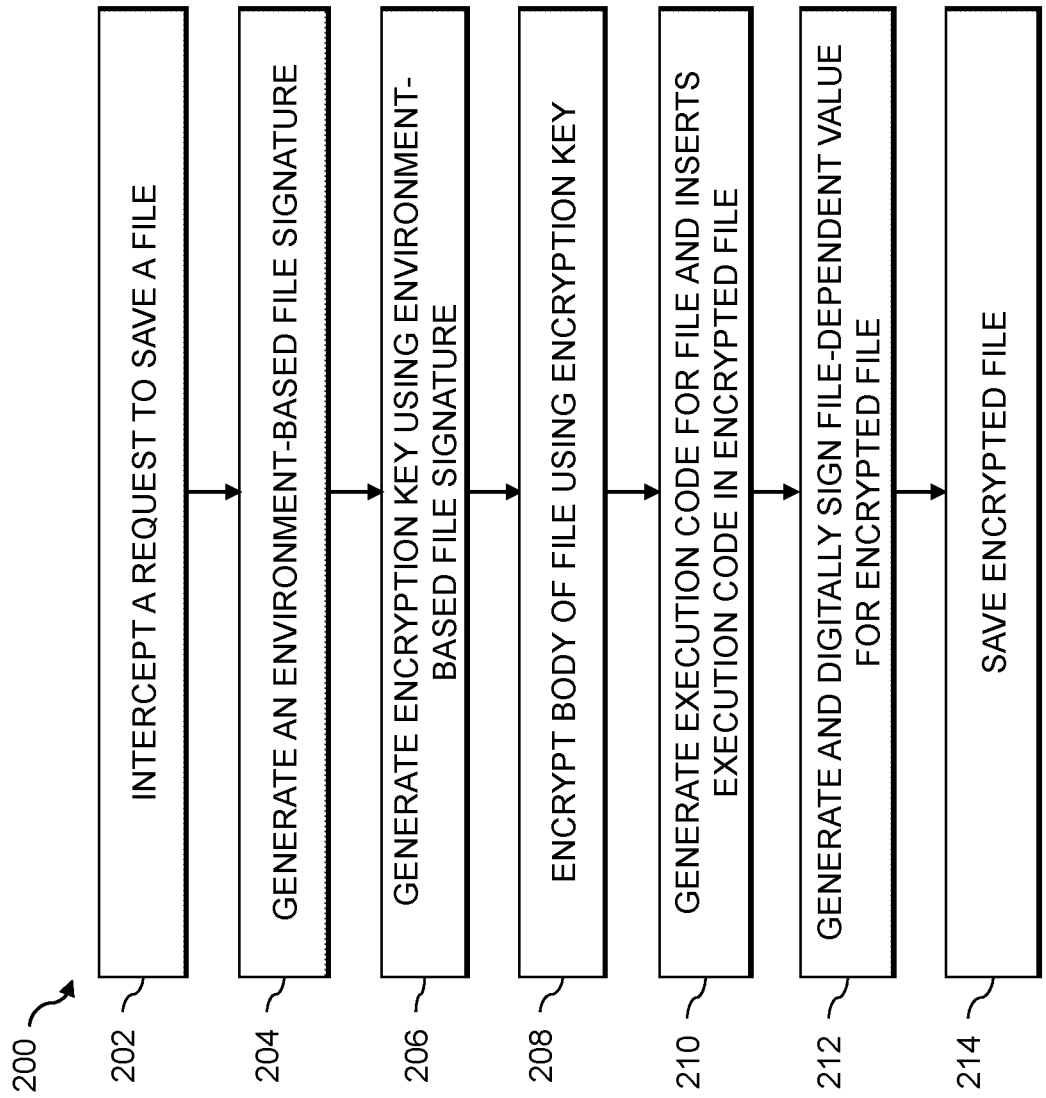
FIGS. 2 through 4 are flow diagrams illustrating exemplary implementations of data protection processes using encryption and inserted execution code, according to various embodiments.

FIG. 2 is a flow chart illustrating an exemplary implementation of a file save process 200 that employs data protection using encryption and inserted execution code, according to one embodiment of the disclosure. In some embodiments, the file save process 200 may be performed, for example, by a corresponding data protection agent 103 when a write operation is performed on a particular user device 102. The file can be saved locally on the respective user device 102, or remotely in a server or storage system 120 associated with a particular organization or enterprise (or designated portion thereof).

As shown in FIG. 2, a request to save a file (e.g., a save or write operation) is intercepted in step 202. An environment-based signature is generated in step 204. In some embodiments, the environment-based signature is unique for each file (or other data element).

In one or more embodiments, for a collaborative sharing of files among members of a team or group, the collaborative environment-based signature generation functionality may be provided to the data protection agent 103 of the respective user devices 102, for example, as part of a registration of each authorized user (or user device 102) by the data protection server 105 as an authorized collaborator within a particular group. For example, for a collaborative file, the environment-based signature may be based at least in part on a network identifier associated with a particular group or another group identifier.

As discussed further below in conjunction with FIG. 3, a protected file may only be accessed in an authorized environment. The authorized environment for a particular file may comprise, for example, a standalone user device 102 (e.g., for private user documents), a user device 102 of each team member, a user device 102 of each department member, and/or a user device 102 of each division member. In addition, the scope of the authorized environment may be separately specified for particular files. The scope of the authorized environment may be managed, for example, by the data protection collaboration module 114 of FIG. 1.

In some embodiments, the environment-based signature is based at least in part on identifiers or content of one or more hardware, software and/or network elements of at least one device.

For software elements, a hash function can be applied to (i) a code representation (e.g., text) of at least portions of each software element or (ii) at least portions of an identifier of each software element in (or otherwise associated with) a particular device. The software identifiers may comprise, for example, software serial numbers and/or software product name and version information.

For hardware elements, a hash function can be applied to a serial number or another identifier of one or more hardware elements in (or otherwise associated with) a particular device. The hardware element identifiers of one or more hardware components within (or associated with) a particular device may comprise, for example, central processing unit (CPU) serial numbers, disk serial numbers, network card serial numbers, a BIOS serial number, a graphics processing unit (GPU) serial number, a RAM part number, and a monitor serial number.

The network address elements of the particular device may comprise, for example, a virtual private network (VPN) identifier (or an RSA identifier), a media access control address (MAC address) of one or more hardware elements of the particular device, a domain name server (DNS) address, a Dynamic Host Configuration Protocol (DHCP) address and/or a static IP address.

In one or more embodiments, the hash values for each hardware, software and/or network element may be summed and optionally combined with one or more salt values to add complexity to the environment-based signature. In the case of a hardware element being a sub-system comprising multiple components (e.g., provided by a third party), the hash value may be associated with the sub-system, for example, and not each of the individual components within the sub-system.

As shown in FIG. 2, an encryption key is generated in step 206 using the environment-based signature. For example, the environment-based signature may be applied, potentially with additional parameters, to a key generation process. The body of the file is encrypted in step 208 using the generated encryption key.

In step 210, execution code for the file is generated and inserted in the encrypted file (for example, in the top of the file, the bottom of the file or another designated portion). In at least some embodiments, the inserted execution code comprises the environment-based signature, as discussed above, and one or more functions for interacting with the data protection agent 103, for the purpose of environment verification, on a user device 102 that attempts to read or otherwise open the file, as discussed further below in conjunction with FIG. 3. The data protection agent 103 may insert the generated execution code in the encrypted file using steganography techniques, as discussed above.

A file-dependent value (e.g., a hash value) is generated for the file (comprising the execution code) and the file-dependent value is then digitally signed in step 212 using a trusted certificate authority. The hash function may be implemented, for example, using a SHA-2 (Secure Hash Algorithm 2) hash function. In some embodiments, the signed file-dependent value of the file provides integrity validation of the data (e.g., to protect the data from data tampering and/or unauthorized changes by any other process or user). The digital signing validates, for example, that a specific file (e.g., data) and file-dependent value were created by a validated authority and have not changed.

In step 214, the encrypted file is saved.

Figure 3:
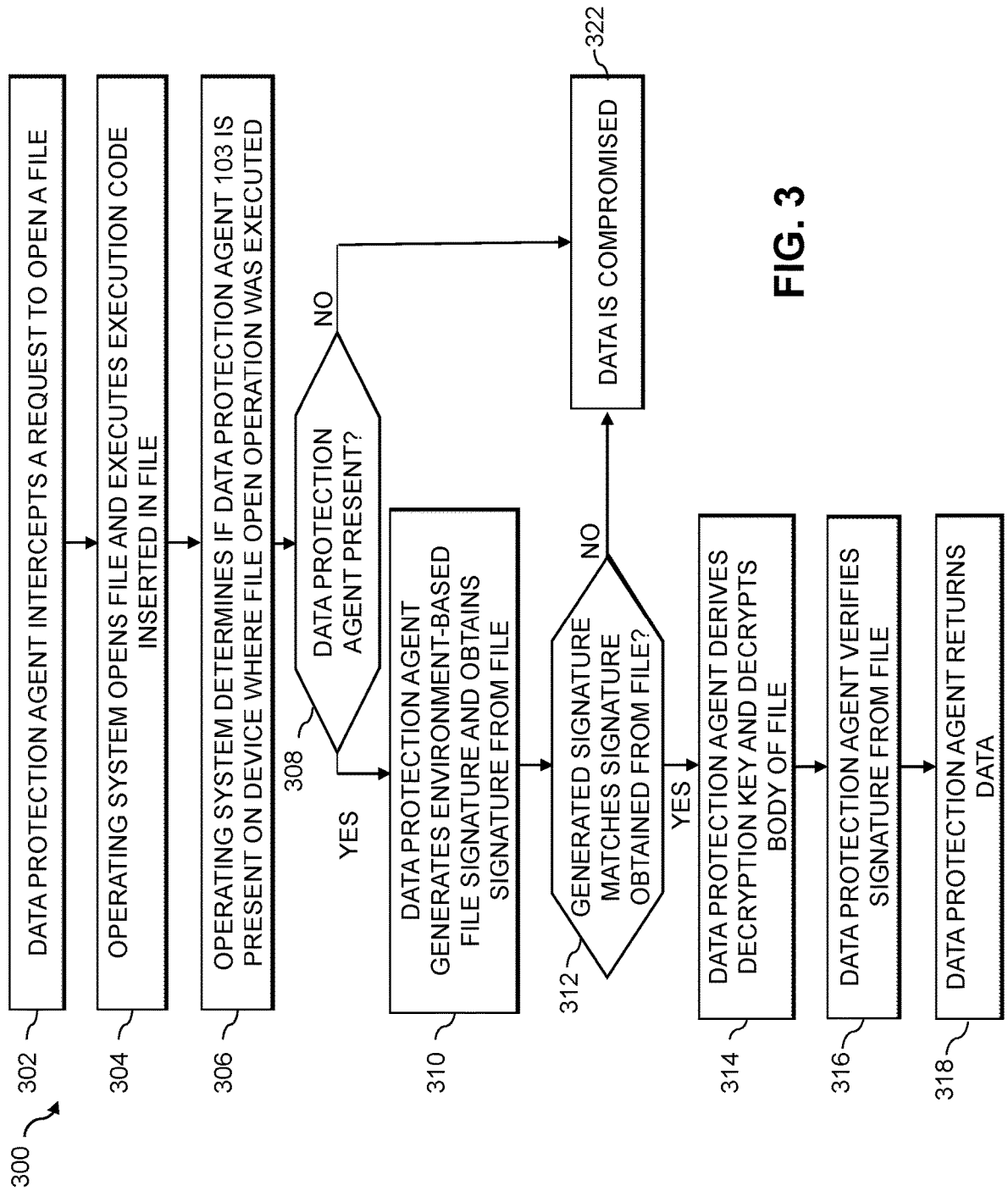

FIG. 3 is a flow diagram illustrating an exemplary implementation of a file open process 300 that employs data protection using encryption and inserted execution code, according to one or more embodiments. In some embodiments, the file open process 300 may be implemented, for example, when a read operation is performed on a particular user device 102. The file can be opened locally from the respective user device 102, or remotely from a server or storage system 120 associated with a particular organization or enterprise (or designated portion thereof).

The exemplary file open process 300 evaluates whether the requested file is being opened in an authorized environment. The authorized environment may comprise, for example, a user device 102 of each team member, a user device 102 of each department member, and/or a user device 102 of each division member. The scope of the authorized environment may be managed, for example, by the data protection collaboration module 114 of FIG. 1.

As shown in FIG. 3, an exemplary data protection agent 103 executing on a particular user device 102 intercepts a request to open a file (e.g., an open or read operation) in step 302. The requested file comprises, for example, (i) an environment-based signature indicating an environment where the file can be accessed and (ii) execution code that interacts with at least one data protection agent 103. The operating system then opens the file in step 304 and executes the execution code that was previously inserted in the file using the file save process 200 (for example, by reading the file from left to right and row by row).

In step 306, the operating system (e.g., in response to functionality in the inserted execution code) determines if a data protection agent 103 is present on the user device 102 where the file open operation was executed. A test is performed in step 308 to determine if the data protection agent 103 is present on the user device 102. If it is determined in step 308 that the data protection agent 103 is not present on the user device 102, then the data is declared as compromised in step 322. If, however, it is determined in step 308 that the data protection agent 103 is present on the user device 102, then the data protection agent 103 generates the environment-based signature in step 310 and also obtains the previously stored environment-based signature from the file.

A further test is performed in step 312 to determine if the environment-based signature generated in step 310 matches the environment-based signature obtained from the file being opened. If it is determined in step 312 that the environment-based signature generated in step 310 does not match the environment-based signature obtained from the file, then the data is declared as compromised in step 322.

If, however, it is determined in step 312 that the environment-based signature generated in step 310 matches the environment-based signature obtained from the file, then the data protection agent 103 derives the decryption key from the environment-based file signature and then decrypts the body of the file in step 314.

In step 316, the data protection agent 103 verifies the digital signature of the file-dependent value associated with the file. If the digital signature of the file-dependent value associated with the file is verified in step 316, the data protection agent 103 then returns the data associated with the file in step 318.

One or more automated remedial actions can be performed upon detection of compromised data in step 322, such as generating a notification to one or more users regarding the discovered threat, optionally with one or more suggested solutions. For example, the data protection server 105 can optionally initiate or execute one or more predefined remedial steps and/or mitigation steps to address the detected anomalies with the data. The predefined remedial steps and/or mitigation steps to address the detected anomalies may comprise the transmission of an alert or alarm to one or more user devices 102 and/or users for important or suspicious events; isolating, removing, quarantining, limiting permissions, analyzing, and deactivating the user device 102 that attempted to open a file without proper authorization, one or more other user devices 102 and/or one or more files, accounts or aspects of the system 100, user devices 102 or the user; notifying one or more third party systems (such as sending an email, or generating an alert in another system); restricting access of one or more accounts and one or more user devices 102 or services from accessing a network, files or folders; initiating a step-up authentication with one or more additional authentication factors; resetting or limiting permissions associated with a file or folder; quarantining one or more files or folders, and preventing one or more further actions from being executed associated with the system 100, user devices 102, user account, service or machine associated with the detected anomalous activity.

Figure 4:
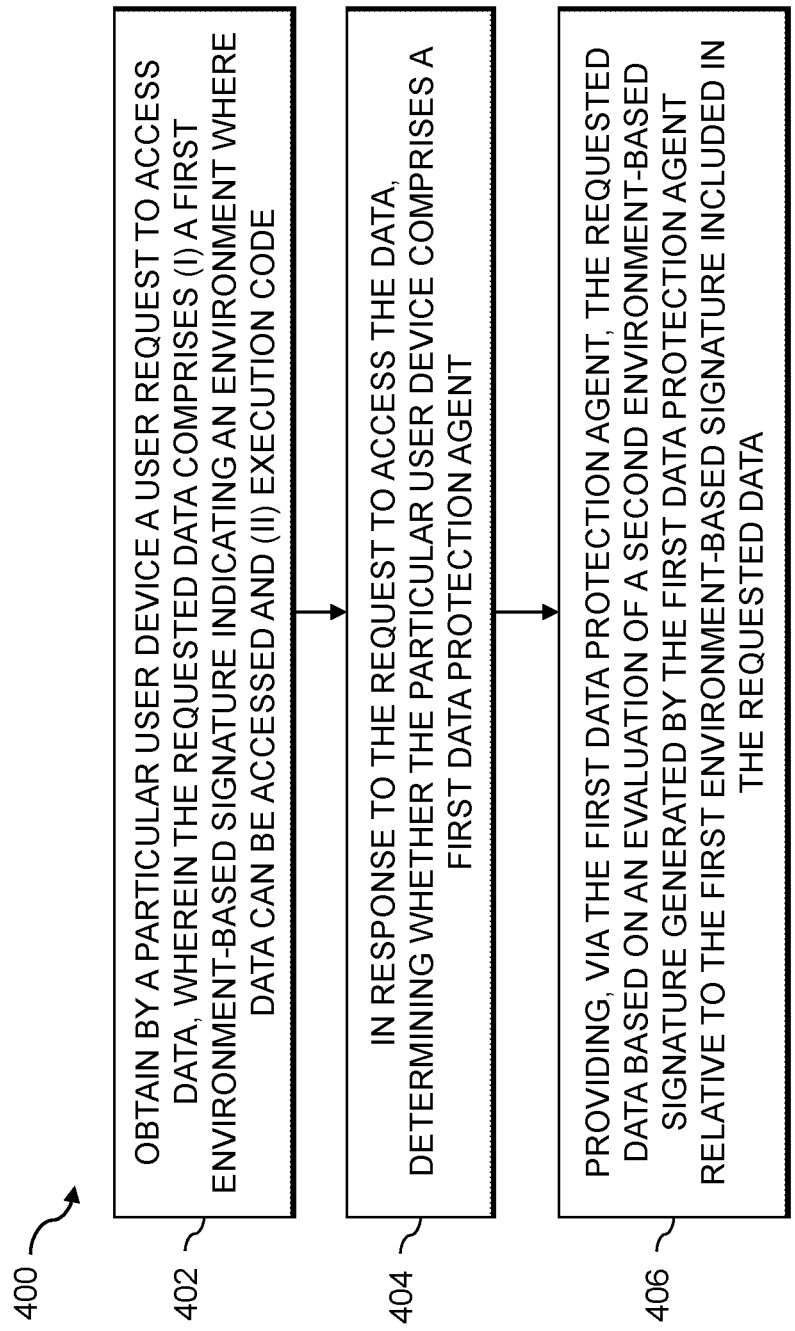

FIG. 4 is a flow diagram illustrating an exemplary implementation of a data protection process 400 that uses encryption and inserted execution code to protect data, according to some embodiments of the disclosure. As shown in FIG. 4, the data protection process 400 initially obtains, by a particular user device, at least one request from a user to access data in step 402, wherein the requested data comprises (i) a first environment-based signature indicating an environment where the data can be accessed and (ii) execution code that interacts with at least one data protection agent. In response to the at least one request to access the data, in step 404, the exemplary data protection process 400 determines whether the particular user device comprises a first data protection agent.

The requested data is provided, via the first data protection agent, in step 406 based on an evaluation of a second environment-based signature generated by the data protection agent relative to the first environment-based signature included in the requested data.

In some embodiments, the requested data is created by a second data protection agent that generates the environment-based signature using one or more identifiers of one or more of hardware elements, software elements and network elements associated with a device that executes the second data protection agent. The second data protection agent may also (i) encrypt at least a portion of the requested data using an encryption key based at least in part on the environment-based signature and/or digitally sign a file-dependent value (e.g., a hash value) associated with the requested data.

If the requested data is encrypted, the first data protection agent may derive a decryption key based on the environment-based signature included in the requested data to decrypt the encrypted requested data. In addition, the requested data may further comprise a digital signature and the first data protection agent may verify the digital signature.

The particular processing operations and other network functionality described in conjunction with the flow diagrams of FIGS. 2 through 4, for example, are presented by way of illustrative example only, and should not be construed as limiting the scope of the disclosure in any way. Alternative embodiments can use other types of processing operations to protect data using encryption and inserted execution code. For example, the ordering of the process steps may be varied in other embodiments, or certain steps may be performed concurrently with one another rather than serially. In one aspect, the process can skip one or more of the actions. In other aspects, one or more of the actions are performed simultaneously. In some aspects, additional actions can be performed.

In this manner, when an unauthorized and/or malicious attempt to open a particular file is detected using the disclosed techniques, one or more designated users can be notified to respond to the attack and further security breaches with the system 100 can be mitigated. The unauthorized user devices 102 can optionally be disabled from further operation or otherwise shutdown to prevent the unauthorized user devices 102 from harming the data and/or network environment.

The disclosed techniques for data protection using encryption and inserted execution code can be employed to prevent unauthorized file accesses outside of an authorized environment. In this manner, the disclosed data protection techniques disable the ability of a malicious actor to open a protected file using an unauthorized device. In at least some embodiments, the disclosed data protection techniques provide protection for removable media (e.g., USB drives, smartphones and Bluetooth devices) and specify which files (or other data) can be copied to such removable devices and can prevent unauthorized attempts to access the files (or other data).

One or more embodiments of the disclosure provide improved methods, apparatus and computer program products for data protection using encryption and inserted execution code. The foregoing applications and associated embodiments should be considered as illustrative only, and numerous other embodiments can be configured using the techniques disclosed herein, in a wide variety of different applications.

It should also be understood that the disclosed data protection techniques, as described herein, can be implemented at least in part in the form of one or more software programs stored in memory and executed by a processor of a processing device such as a computer. As mentioned previously, a memory or other storage device having such program code embodied therein is an example of what is more generally referred to herein as a "computer program product."

The disclosed techniques for data protection using encryption and inserted execution code may be implemented using one or more processing platforms. One or more of the processing modules or other components may therefore each run on a computer, storage device or other processing platform element. A given such element may be viewed as an example of what is more generally referred to herein as a "processing device."

As noted above, illustrative embodiments disclosed herein can provide a number of significant advantages relative to conventional arrangements. It is to be appreciated that the particular advantages described above and elsewhere herein are associated with particular illustrative embodiments and need not be present in other embodiments. Also, the particular types of information processing system features and functionality as illustrated and described herein are exemplary only, and numerous other arrangements may be used in other embodiments.

In these and other embodiments, compute services can be offered to cloud infrastructure tenants or other system users as a PaaS offering, although numerous alternative arrangements are possible.

Some illustrative embodiments of a processing platform that may be used to implement at least a portion of an information processing system comprise cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components such as a cloud-based data protection engine, or portions thereof, are illustratively implemented for use by tenants of such a multi-tenant environment.

Cloud infrastructure as disclosed herein can include cloud-based systems such as AWS, GCP and Microsoft Azure. Virtual machines provided in such systems can be used to implement at least portions of a cloud-based data protection platform in illustrative embodiments. The cloud-based systems can include object stores such as Amazon S3, GCP Cloud Storage, and Microsoft Azure Blob Storage.

In some embodiments, the cloud infrastructure additionally or alternatively comprises a plurality of containers implemented using container host devices. For example, a given container of cloud infrastructure illustratively comprises a Docker container or other type of Linux Container (LXC). The containers may run on virtual machines in a multi-tenant environment, although other arrangements are possible. The containers may be utilized to implement a variety of different types of functionality within the storage devices. For example, containers can be used to implement respective processing devices providing compute services of a cloud-based system. Again, containers may be used in combination with other virtualization infrastructure such as virtual machines implemented using a hypervisor.

Illustrative embodiments of processing platforms will now be described in greater detail with reference to FIGS. 5 and 6. These platforms may also be used to implement at least portions of other information processing systems in other embodiments.

Figure 5:
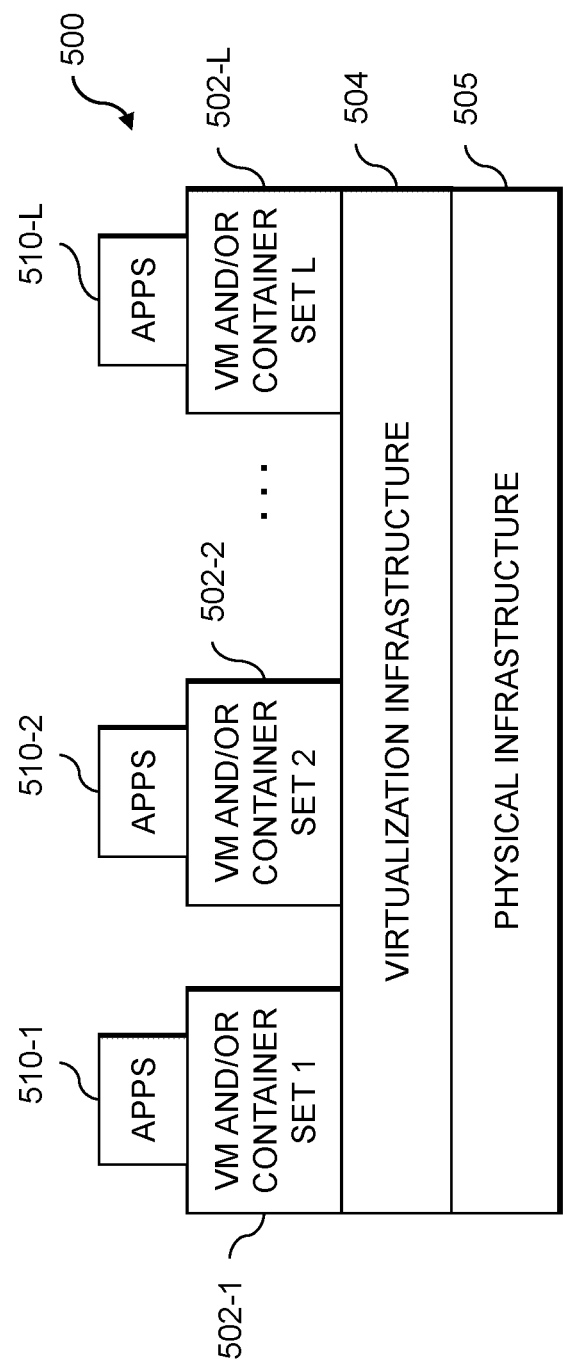
FIG. 5 illustrates an exemplary processing platform that may be used to implement at least a portion of one or more embodiments of the disclosure comprising a cloud infrastructure.

FIG. 5 shows an example processing platform comprising cloud infrastructure 500. The cloud infrastructure 500 comprises a combination of physical and virtual processing resources that may be utilized to implement at least a portion of the information processing system 100. The cloud infrastructure 500 comprises multiple virtual machines (VMs) and/or container sets 502-1, 502-2, . . . 502-L implemented using virtualization infrastructure 504. The virtualization infrastructure 504 runs on physical infrastructure 505, and illustratively comprises one or more hypervisors and/or operating system level virtualization infrastructure. The operating system level virtualization infrastructure illustratively comprises kernel control groups of a Linux operating system or other type of operating system.

The cloud infrastructure 500 further comprises sets of applications 510-1, 510-2, . . . 510-L running on respective ones of the VMs/container sets 502-1, 502-2, . . . 502-L under the control of the virtualization infrastructure 504. The VMs/container sets 502 may comprise respective VMs, respective sets of one or more containers, or respective sets of one or more containers running in VMs.

In some implementations of the FIG. 5 embodiment, the VMs/container sets 502 comprise respective VMs implemented using virtualization infrastructure 504 that comprises at least one hypervisor. Such implementations can provide data protection functionality of the type described above for one or more processes running on a given one of the VMs. For example, each of the VMs can implement data protection control logic and associated environment-based file signature verification functionality for one or more processes running on that particular VM.

An example of a hypervisor platform that may be used to implement a hypervisor within the virtualization infrastructure 504 is the VMware® vSphere® which may have an associated virtual infrastructure management system such as the VMware® vCenter™. The underlying physical machines may comprise one or more distributed processing platforms that include one or more storage systems.

In other implementations of the FIG. 5 embodiment, the VMs/container sets 502 comprise respective containers implemented using virtualization infrastructure 504 that provides operating system level virtualization functionality, such as support for Docker containers running on bare metal hosts, or Docker containers running on VMs. The containers are illustratively implemented using respective kernel control groups of the operating system. Such implementations can provide data protection functionality of the type described above for one or more processes running on different ones of the containers. For example, a container host device supporting multiple containers of one or more container sets can implement one or more instances of data protection control logic and associated environment-based file signature verification functionality.

As is apparent from the above, one or more of the processing modules or other components of system 100 may each run on a computer, server, storage device or other processing platform element. A given such element may be viewed as an example of what is more generally referred to herein as a "processing device." The cloud infrastructure 500 shown in FIG. 5 may represent at least a portion of one processing platform. Another example of such a processing platform is processing platform 600 shown in FIG. 6.

The processing platform 600 in this embodiment comprises at least a portion of the given system and includes a plurality of processing devices, denoted 602-1, 602-2, 602-3, . . . 602-K, which communicate with one another over a network 604. The network 604 may comprise any type of network, such as a WAN, a LAN, a satellite network, a telephone or cable network, a cellular network, a wireless network such as WiFi or WiMAX, or various portions or combinations of these and other types of networks.

The processing device 602-1 in the processing platform 600 comprises a processor 610 coupled to a memory 612. The processor 610 may comprise a microprocessor, a microcontroller, an ASIC, an FPGA or other type of processing circuitry, as well as portions or combinations of such circuitry elements, and the memory 612, which may be viewed as an example of a "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 602-1 is network interface circuitry 614, which is used to interface the processing device with the network 604 and other system components, and may comprise conventional transceivers.

The other processing devices 602 of the processing platform 600 are assumed to be configured in a manner similar to that shown for processing device 602-1 in the figure.

Again, the particular processing platform 600 shown in the figure is presented by way of example only, and the given system may include additional or alternative processing platforms, as well as numerous distinct processing platforms in any combination, with each such platform comprising one or more computers, storage devices or other processing devices.

Figure 6:
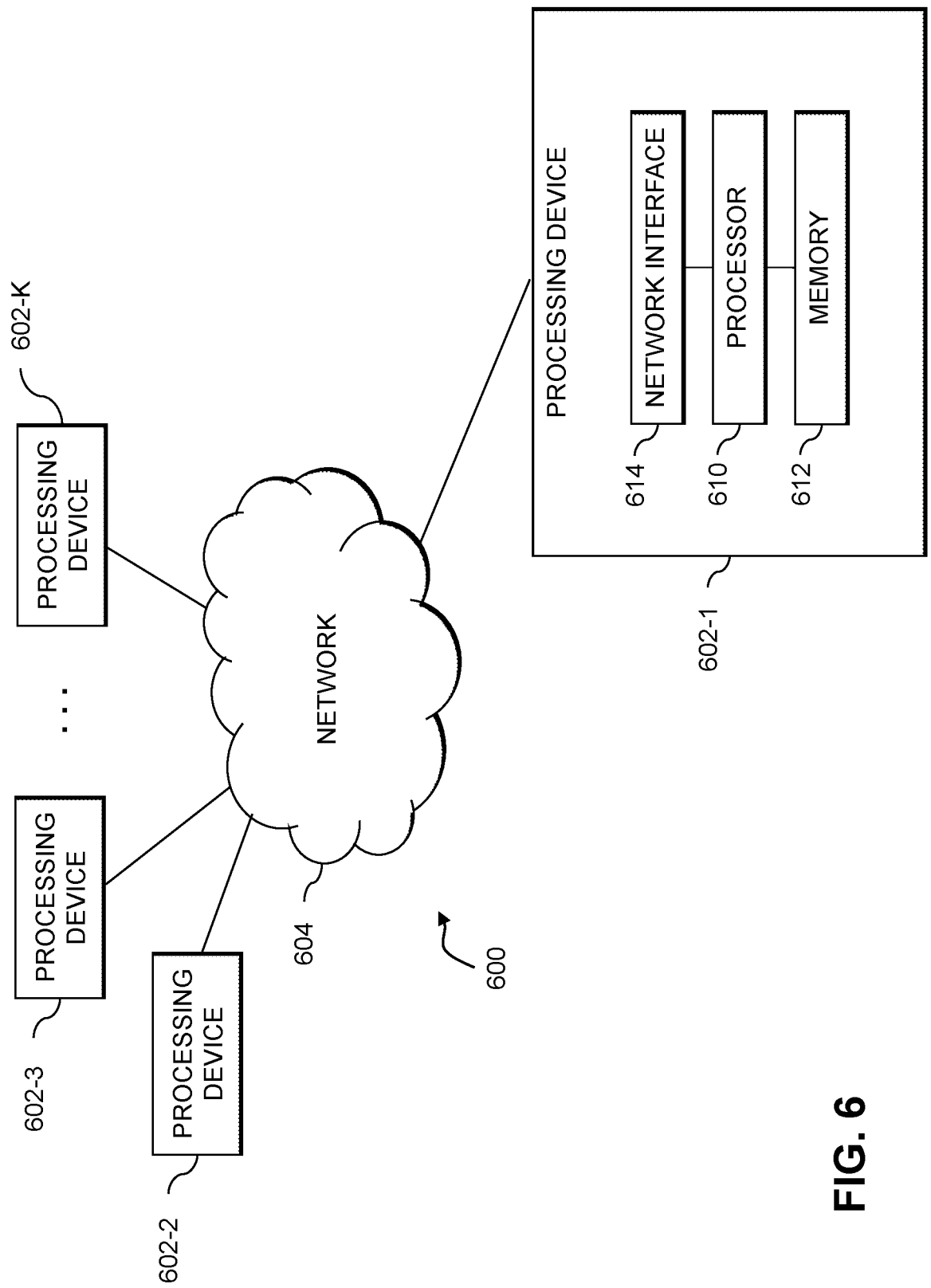
FIG. 6 illustrates another exemplary processing platform that may be used to implement at least a portion of one or more embodiments of the disclosure.

Multiple elements of an information processing system may be collectively implemented on a common processing platform of the type shown in FIG. 5 or 6, or each such element may be implemented on a separate processing platform.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure such as VxRail™, VxRack™, VxBlock™, or Vblock® converged infrastructure commercially available from Dell Technologies.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in the information processing system. Such components can communicate with other elements of the information processing system over any type of network or other communication media.

As indicated previously, components of an information processing system as disclosed herein can be implemented at least in part in the form of one or more software programs stored in memory and executed by a processor of a processing device. For example, at least portions of the functionality shown in one or more of the figures are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A method, comprising:

obtaining, by a particular user device, at least one request from a user to access data, wherein the requested data is encrypted and comprises (i) a first environment-based signature indicating an environment where the data can be accessed and (ii) execution code that is used to determine whether at least one data protection agent is executing on the particular user device;

performing the following steps, in response to the at least one request to access the data:

executing the execution code, obtained from the requested data, on the particular user device to determine whether the particular user device comprises a first data protection agent executing on the particular user device;

deriving, by the first data protection agent executing on the particular user device, a decryption key based at least in part on the first environment-based signature included in the requested data to decrypt the encrypted requested data;

generating, by the first data protection agent executing on the particular user device, a second environment-based signature; and providing, by the first data protection agent executing on the particular user device, the requested data to the user based at least in part on an evaluation of the second environment-based signature generated by the first data protection agent relative to the first environment-based signature included in the requested data;

wherein the method is performed by at least one processing device comprising a processor coupled to a memory.

2. The method of claim 1, wherein the requested data is created by a second data protection agent that generates the first environment-based signature using one or more identifiers of one or more of hardware elements, software elements and network elements associated with a device that executes the second data protection agent.

3. The method of claim 2, further comprising, by the second data protection agent, encrypting at least a portion of the requested data using an encryption key based at least in part on one or more of the first environment-based signature and the second environment-based signature.

4. The method of claim 2, further comprising, by the second data protection agent, digitally signing a file-dependent value associated with the requested data.

5. The method of claim 2, wherein the second data protection agent comprises one or more of a same data protection agent and a different data protection agent relative to the first data protection agent.

6. The method of claim 1, wherein the requested data further comprises a digital signature and further comprising, by the first data protection agent, verifying the digital signature.

7. The method of claim 1, further comprising performing one or more automated remedial actions based at least in part on a result of one or more of (i) the determining the whether the particular user device comprises the first data protection agent and (ii) the evaluation of the second environment-based signature.

8. An apparatus comprising:
at least one processing device comprising a processor coupled to a memory;
the at least one processing device being configured to implement the following steps:
obtaining, by a particular user device, at least one request from a user to access data, wherein the requested data is encrypted and comprises (i) a first environment-based signature indicating an environment where the data can be accessed and (ii) execution code that is used to determine whether at least one data protection agent is executing on the particular user device;
performing the following steps, in response to the at least one request to access the data:
executing the execution code, obtained from the requested data, on the particular user device to determine whether the particular user device comprises a first data protection agent executing on the particular user device;
deriving, by the first data protection agent executing on the particular user device, a decryption key based at least in part on the first environment-based signature included in the requested data to decrypt the encrypted requested data;
generating, by the first data protection agent executing on the particular user device, a second environment-based signature; and
providing, by the first data protection agent executing on the particular user device, the requested data to the user based at least in part on an evaluation of the second environment-based signature generated by the first data protection agent relative to the first environment-based signature included in the requested data.

9. The apparatus of claim 8, wherein the requested data is created by a second data protection agent that generates the first environment-based signature using one or more identifiers of one or more of hardware elements, software elements and network elements associated with a device that executes the second data protection agent.

10. The apparatus of claim 9, further comprising, by the second data protection agent, encrypting at least a portion of the requested data using an encryption key based at least in part on one or more of the first environment-based signature and the second environment-based signature.

11. The apparatus of claim 9, further comprising, by the second data protection agent, digitally signing a file-dependent value associated with the requested data.

12. The apparatus of claim 9, wherein the second data protection agent comprises one or more of a same data protection agent and a different data protection agent relative to the first data protection agent.

13. The apparatus of claim 8, wherein the requested data further comprises a digital signature and further comprising, by the first data protection agent, verifying the digital signature.

14. The apparatus of claim 8, further comprising performing one or more automated remedial actions based at least in part on a result of one or more of (i) the determining the whether the particular user device comprises the first data protection agent and (ii) the evaluation of the second environment-based signature.

15. A non-transitory processor-readable storage medium having stored therein program code of one or more software programs, wherein the program code when executed by at least one processing device causes the at least one processing device to perform the following steps:
obtaining, by a particular user device, at least one request from a user to access data, wherein the requested data is encrypted and comprises (i) a first environment-based signature indicating an environment where the data can be accessed and (ii) execution code that is used to determine whether at least one data protection agent is executing on the particular user device;
performing the following steps, in response to the at least one request to access the data:
executing the execution code, obtained from the requested data, on the particular user device to determine whether the particular user device comprises a first data protection agent executing on the particular user device;
deriving, by the first data protection agent executing on the particular user device, a decryption key based at least in part on the first environment-based signature included in the requested data to decrypt the encrypted requested data;
generating, by the first data protection agent executing on the particular user device, a second environment-based signature; and
providing, by the first data protection agent executing on the particular user device, the requested data to the user based at least in part on an evaluation of the second environment-based signature generated by the first data protection agent relative to the first environment-based signature included in the requested data.

16. The non-transitory processor-readable storage medium of claim 15, wherein the requested data is created by a second data protection agent that generates the first environment-based signature using one or more identifiers of one or more of hardware elements, software elements and network elements associated with a device that executes the second data protection agent.

17. The non-transitory processor-readable storage medium of claim 16, further comprising, by the second data protection agent, encrypting at least a portion of the requested data using an encryption key based at least in part on one or more of the first environment-based signature and the second environment-based signature.

18. The non-transitory processor-readable storage medium of claim 16, further comprising, by the second data protection agent, digitally signing a file-dependent value associated with the requested data.

19. The non-transitory processor-readable storage medium of claim 15, wherein the requested data further comprises a digital signature and further comprising, by the first data protection agent, verifying the digital signature.

20. The non-transitory processor-readable storage medium of claim 15, further comprising performing one or more automated remedial actions based at least in part on a result of one or more of (i) the determining the whether the particular user device comprises the first data protection agent and (ii) the evaluation of the second environment-based signature.

* * * * *